United States Patent [19]

Kernion et al.

[11] Patent Number: 5,007,615
[45] Date of Patent: Apr. 16, 1991

[54] REFRACTORY SLIDE GATE ASSEMBLY AND METHOD

[75] Inventors: Mark C. Kernion, East Pittsburgh; Ben Davies, deceased, late of Pittsburgh, both of Pa., by Evelyn Davies, executrix

[73] Assignee: Dresser Industries, Inc., Dallas, Tex.

[21] Appl. No.: 283,253

[22] Filed: Dec. 12, 1988

[51] Int. Cl.$^5$ .............................................. B22D 41/08
[52] U.S. Cl. .................................... 251/368; 251/144; 222/600; 266/44
[58] Field of Search ..................... 222/600, 596, 606; 266/44; 251/368, 144

[56] References Cited

U.S. PATENT DOCUMENTS

| | | | |
|---|---|---|---|
| 4,175,974 | 11/1979 | Grabner et al. | 222/600 |
| 4,179,046 | 12/1979 | Jeschke et al. | 222/600 |
| 4,182,466 | 1/1980 | Fehling et al. | 222/600 |
| 4,257,543 | 3/1981 | Muschner et al. | 222/600 |
| 4,424,955 | 1/1984 | Wells | 266/44 |
| 4,497,473 | 2/1985 | Robyn et al. | 222/600 |
| 4,583,721 | 4/1986 | Arakawa et al. | 222/603 |

FOREIGN PATENT DOCUMENTS 165559 12/1981 Japan ........................ 222/600

Primary Examiner—A. Michael Chambers
Attorney, Agent, or Firm—Sigalos, Levine & Montgomery

[57] ABSTRACT

A slide gate assembly for use with a metal-working vessel comprising at least one stationary refractory plate and at least one sliding refractory plate slidably engaged with said stationary plate, said refractory plates each having at least one passage therethrough and spaced in relation to each other such that said sliding refractory plate can be moved to bring its passage into and out of alignment with the passage of said at least one stationary plate to effect discharge or retention of molten metal in said metal-working vessel; at least a portion of each of said refractory plates consisting essentially of an unburned high-strength carbon-bonded magnesite refractory containing at least about 5% by weight carbon and at least about 74% by weight magnesite.

23 Claims, 1 Drawing Sheet

REFRACTORY SLIDE GATE ASSEMBLY AND METHOD

BACKGROUND OF THE INVENTION

The present invention relates to refractory slide gate assemblies and especially to the slide gate portions of such assemblies.

It is conventional to use slide gates for the discharge of molten metals from various metal working vessels such as bottom pouring ladles, tundishes, and the like.

Conventionally, such assemblies include a stationary refractory plate mounted to the bottom of the container and having a passage therethrough through which the molten metal can pass. A slide plate also of refractory material is slidably engaged with the lower face of the stationary plate and also has a passage therethrough which can be brought into alignment with the passage in the upper stationary plate. In some instances there is also a bottom stationary refractory plate which abuts the intermediate sliding gate plate. This bottom plate also has a passage therethrough which is aligned with the other passages to permit discharge of the molten metal from the vessel. There are associated with such plates the usual metallic mounting devices to hold the assembly in place and, of course, means provided; usually hydraulic, to move the slide gate such that its passage comes into and out of alignment with the passages in the upper and lower stationary plates to respectively permit removal or to maintain the melt in the vessel. There are a variety of different shapes and forms of such slide gates, but they all perform the essential function of permitting ready removal of the liquid melt from the container at the desired time.

There are also associated with such assemblies elements such as nozzles and the like which are also made of refractory materials.

While generally satisfactory, the refractory portions of the slide gate assembly have to be regularly replaced due to wear. This is costly and time-consuming with the slide plates and those other portions which come in contact with the molten metal wearing most rapidly. The present refractories from which the plates and other portions are made are susceptible to thermal shock and corrosion caused by contact with the molten metal.

Ceramic bonded burned magnesite plates have also been used, but these have the least thermal shock resistance of all plates. These plates are made by mixing magnesite grains with a temporary binder, pressing the mixture in the shape of the plate desired, and burning the plate at high temperature; i.e., about 2850° F. or higher. The burned plate can be impregnated with tar or pitch to inhibit penetration of the pore structure of the plate by metal and slag during use. The impregnated shapes are often baked at about 600° to 850° F. or higher prior to use to reduce or eliminate the volatiles and/or drainage of the tar or pitch. But these plates are also very prone to thermal shock damage which contributes to their wear. The movement of the passing metal; such as steel, and slag can cause heavy corrosion due both to the physical and chemical activity of the molten metal and, thus, causes deterioration of these plates requiring, as noted, their replacement. This is a costly and time-consuming process and efforts to prolong the life of such refractory plates have not been successful.

SUMMARY OF THE INVENTION

An improved slide gate assembly and portions thereof have now been found which have higher hot strength and slag resistance than the conventional burned basic magnesite slide gates presently in use and, in addition, has much greater spalling resistance.

Briefly, the present invention comprises a slide gate assembly comprising at least one stationary refractory plate and a sliding refractory plate in contact with and slidably engaged with said stationary plate, said refractory plates each having at least one passage therethrough and spaced in relation to each other such that the sliding refractory plate can be moved to bring its passage into and out of alignment with the passage of said at least one stationary plate; at least a portion of the sliding refractory plate consisting essentially of a baked high-strength carbon-bonded magnesite refractory as hereinafter set forth.

The present invention also comprises the sliding refractory plate and/or insert means for such plate and/or the stationary plates and refractory elements associated with the slide gate assembly, the method of making such plates, parts, and such assembly as hereinafter described.

DETAILED DESCRIPTION

The particular shape of the plates, insert means (such as nozzles) and the like that are part of the slide gate valve assembly are not critical. The present invention can be utilized with plates, insert means, and the like of any size, shape, or form and the drawings and the description that follows is of typical designs of two- and three-plate slide gate assemblies with a single passage in each plate and insert means for purposes of illustrating the invention.

Figure 1:
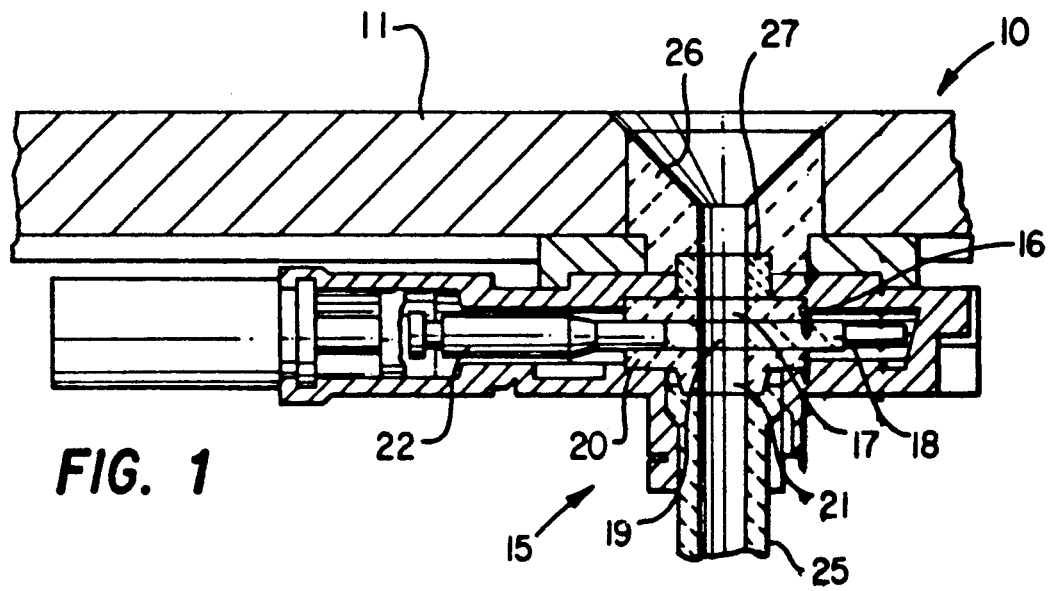
FIG. 1 of the drawings is an elevational sectional view showing a portion of a metal working vessel to which is attached a three-plate slide gate assembly of the instant invention.

Referring to FIG. 1 of the drawing, the bottom portion 10 of a metal working vessel, such as a ladle, has attached to the bottom 11 thereof by any conventional means (not shown) slide gate assembly 15. Slide gate assembly 15 comprises an upper stationary refractory plate 16 of a refractory material having a passage 17 therethrough aligned with the discharge opening 13 in vessel 10. Slidably engaged with upper plate 16 and abutting the same is sliding refractory plate 18 also having therein a passage 19 which can be brought into and out of alignment with passage 17. A bottom stationary refractory plate 20 also abuts sliding refractory plate 19 and has a passage 21 therein aligned with passage 17. When sliding plate 18 is moved so as to bring passage 19 into alignment with passage 17, the molten metal is discharged from vessel 10. Hydraulic means 22 are utilized to move the sliding plate 18. Discharge nozzle 25 is provided to carry the metal from passage 21. The vessel 10 is also provided with refractory inserts 26 and 27 to discharge the molten metal into the slide gate assembly 15.

Figure 2:
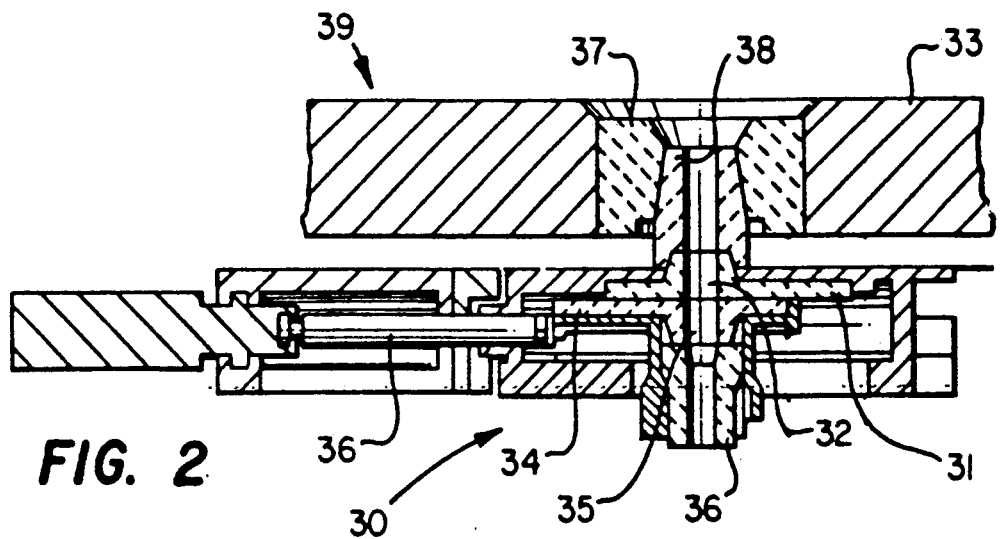
FIG. 2 is an elevational sectional view showing a portion of a metal working vessel to which is attached a two-plate slide gate assembly of the present invention.

FIG. 2 depicts a typical two-plate slide gate assembly 30 in which stationary plate 31 with passage 32 is attached to the bottom 33 of a metal working vessel 39 (by means not shown) and sliding plate 34 with opening 35 abuts plate 31. Again the conventional means, such as hydraulic means 36 used to move sliding plate 34 so as to bring passage 35 into and out of alignment with passage 32 thereby either permitting or stopping the flow of metal from the vessel 33. A discharge nozzle 36 is provided to carry the metal from passage 35. Refractory inserts 37 and 38 are located in the vessel bottom 33 to direct the molten metal into slide gate assembly 30.

Figure 3:
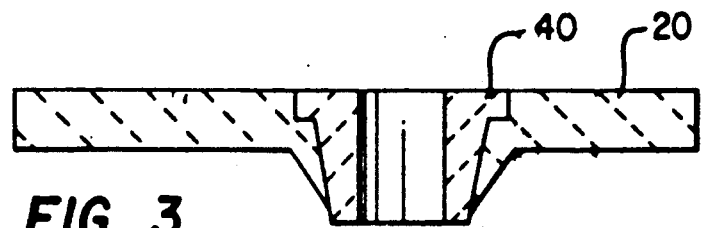
FIG. 3 is an elevational sectional view of nozzle means in accord with the present invention that can be used in or with the slide gate assembly of the instant invention.

Wear can be further minimized by use of insert means such as a nozzle 40, such as shown in FIG. 3, which can be inserted into the passage 21 of lower stationary plate 20 as well as passage 19 of sliding plate 18; after suitable conventional redesign of such passages to accommodate such nozzle means and cementing of the nozzle in the passages, in order to minimize need to entirely replace any of the plates. Such insert means can also be used with plates 16, 30, and 33. As the nozzles become worn, they can be replaced instead of replacing the entire plate. In some instances the nozzle in the upper stationary plate can be perforated and a cooling gas applied thereto to minimize heat damage to the plate and nozzle.

Since wear is usually most severe about the plate passages, repair of worn plates often involves removal of only the worn portion and replacement thereof. This is often accomplished by removal of a circular portion of the plate about the passage which includes all the worn portions and replacing the removed portion with a properly configured insert. Because of the circular nature of these inserts, such inserts are often referred to in the art as "hockey pucks". These hockey pucks are cemented back into the plate and the necessary passage placed therein.

However, even with such replacement the prior art devices have required the more rapid replacement of the magnesite basic slide gates because of their inadequate wear resistance.

Critical in the present invention is the utilization of a special refractory composition to form the plates and/or nozzle, and/or hockey pucks, and the like refractory portions of the slide gate assembly and other refractory elements operatively associated with the slide gate assembly. Preferably, all the plates, nozzles, if any nozzles or other refractory portions associated with the slide gate assembly such as inserts 26, 27, 37, and 38 and discharge nozzles 25 and 26 are used, are made from the composition discussed below. However, suitable results in minimizing replacement of parts can be effected if only parts coming in contact with the metal and the sliding gate portion of the assembly are made from such material since these portions suffer the greatest deleterious effects from exposure to the molten metal.

More specifically, the refractory composition utilized to make the slide gate is a carbon-bonded magnesite. Preferably, it should also contain a powdered metal selected from aluminum, silicon, magnesium or mixtures thereof as well as, preferably, the addition of a spalling inhibitor.

The magnesite can be any deadburned or fused magnesite having a bulk specific gravity of 3.39 or greater, a lime-to-silica ratio of 2:1 or greater, and with a boron oxide content of 0.06% or less.

It is required that the bonding agent used to form the plate yield a substantial amount of carbon on coking and preferred are phenolic resins such as a liquid or powdered novolak resin, or liquid or powdered resol resin, or combinations thereof. The usual curing agents for such novolak resins are used, such as hexamethylenetetramine. However, any other resin that yields a substantial amount of carbon on coking can be used since it is the resin that provides the carbon needed for bonding the refractory at service temperatures.

In addition to the carbon generated by the resin, it is preferred to also add other high carbon-containing materials to increase the carbon content to ensure that the baked plates have at least about 4% by weight carbon which acts to reduce penetration by liquid metal and slag into the resultant formed and cured refractory plate. Preferred is the addition of fine flake graphite; although, other carbon-containing materials such as carbon black, calcined fluid bed petroleum coke, artificial graphite, amorphous graphite and the like can be utilized.

As to the spalling inhibitors, materials such as silicon carbide, zirconia, spinel grain, coarse vein (Sri Lankan) graphite, or alumina can be used.

It is also preferred to impregnate the formed refractory shapes with either tar or pitch in order to increase the strength, reduce the coked porosity, and again increase the carbon content.

As to proportions, the operative and preferred proportions of the components of the composition are as follows:

| Mix | % by Wt. Operative | Preferred |
|---|---|---|
| Magnesite | 38–97.5 | 92.5 |
| Metal powder | 0–7 | 3 |
| Spalling inhibitor | 0–40 | 2 |
| Carbon additive | 2.5–15 | 2.5 |
| Plus additions (for each 100% by weight of mix) | | |
| Resin | 2–6 | 4 |
| Resin curing agent* | 0.2–0.3 | 0.2 |

*No curing agent is required if a resol resin is used.

The process of making the slide gate assembly comprises first admixing the components of the magnesite-carbon composition to ensure thorough mixing and then pressing the mix into the shape desired. As previously noted, a large variety of different shapes of stationary and sliding gates, nozzles, and other inserts are utilized depending upon the particulars of the assembly and the instant composition is suitable for making any refractory portion of the slide gate assembly or of elements associated with the assembly.

The pressed shape is then baked at about 250 to 550° F. to cure the resin. The resultant cured plates are then, preferably, impregnated with either pitch, tar or the like and then baked at temperatures between about 600 to 1000° F. to remove the pitch volatiles. While the shapes can be impregnated and either baked at lower temperatures such as 550° F. or left unbaked, it is preferred to bake them again thoroughly in order to eliminate the pitch and/or tar volatiles and to prevent drainage of the pitch or tar from the plate during service. The high temperatures of the molten metal may cause some of the pitch or tar to be drained as the metal is passing through the assembly and this is undesirable, particularly since the pitch or tar volatiles and residual pitch or tar can ignite when the plates are in use at the high temperatures of the metals being treated. The resultant flames can damage the hydraulic system used to move the sliding plates in service.

Thus, the refractory plates, nozzles, and inserts of the present invention are not burned at elevated temperatures of 2,500° F. or higher as are the prior art magnesite plates and the like and have a low porosity, high strength, and increased spalling resistance as opposed to the burned plates which by burning have ceramic bonds. Also, the instant plates have at least about 4% by weight carbon, whereas burned plates can only have up to about 3% carbon.

The invention will be further described in connection with the following examples which are set forth for purposes of illustration only.

EXAMPLE 1

A comparison was made between slide gate plates of the present invention and one made of burned magnesite in accord with the prior art. The composition of each mix from which the plates were made is set forth in Table I below.

The plates of the present invention were formed by mixing the components of the mix in an Eirich mixer having a rotor speed of 15.4 m/s and operation in a concurrent direction for five minutes. The resultant mixture was fed to a mechanical press where it was formed into shaped plates with a density at the press of 189–190 pcf. The plates were baked at 400° F. for 3 hours, impregnated with tar and then baked again at 800° F. Samples were taken from each of three plates near the bore (passage) in the plates and from the main plate sections. The test samples were then tested and the results are set forth in Table I.

Prior-art burned magnesite slide gate plates were prepared by admixing appropriate fractions of magnesite plus a small addition of fumed silica in an Eirich mixer with a bond composed of lignosulfonate and oil. The resulting batch was pressed into slide gate shapes on a mechanical press, dried, and fired at a temperature of about 2850° F. The resulting slide gates were impregnated with pitch and baked at 400 to 405° F.

The test samples were then tested and the results are set forth in Table I.

TABLE I

| Mix | Instant Invention | | Prior Art | |
|---|---|---|---|---|
| Magnesite | 95% | | 100% | |
| Aluminum Powder | 3 | | | |
| Silicon Carbide −16 +30 mesh | 2 | | | |
| Plus Additions: | | | Plus Additions: | |
| Novolak Resin | 4.3 | | Fumed Silica | 0.4 |
| Hexamethylenetetramine | 0.21 | | Lignosulfonate | 3.4 |
| Flake Graphite | 2.5 | | Oil | 0.6 |

| | Magnesite-Carbon Slide Gate | | Burned Magnesite Slide Gate | |
|---|---|---|---|---|
| | Tests on Samples Taken Near the Bore | Tests on Samples Taken From the Plate Section | Tests on Samples Taken Near the Bore | Tests on Samples Taken From the Plate |
| Porosity Data (After Coking at 2000° F.) | | | | |
| Bulk Density, pcf: | 189 | 186 | 188 | 186 |
| Apparent Porosity, %: | 11.9 | 13.0 | 13.9 | 14.8 |
| Apparent Specific Gravity: | 3.43 | 3.42 | 3.51 | 3.49 |
| Modulus of Rupture at 2000° F., psi: | — | 3390 | — | 2840 |
| Crushing Strength at 2800° F., psi: | — | 2450 | — | 930 |
| Residual Carbon Content, %: | — | 5.07* | 2.72** | 3.14** |
| Propane-Oxygen Flame Impingement (POFI) Test Degree of Spalling | — | Slight | — | Severe |

*After coking at 1000° F.
**After coking at 2000° F.

The slide plates of the present invention had lower coked porosities, higher hot strength, and a much lower degree of spalling as compared to prior art burned magnesite slide gate plates. In the POFI test, results, visual observation noted the difference with "spalling", in this instance referring to peeling away and weakening of the surface of the slide gate test samples as a result of flame impingement.

EXAMPLES 2 TO 6

A series of slide gate compositions was prepared from the mixes set forth below in Table II.

The compositions were mixed in an Eirich mixer, pressed at 18,000 psi on a hydraulic press, baked at 400° F. for 3 hours, impregnated with tar, and then baked again at 1,000° F. The samples were 9-inch long brick rather than slide gate plates as in Example 1. The brick shapes are convenient samples for forming and testing in a laboratory. Since the samples were brick-shaped, there is no test data for bore and plate sections as in Table I.

TABLE II

| Examples No. | 2 | 3 | 4 | 5 | 6 |
|---|---|---|---|---|---|
| Mix:* | | | | | |

TABLE II-continued

| Examples No. | 2 | 3 | 4 | 5 | 6 |
|---|---|---|---|---|---|
| Magnesite | 97% | 97% | 95% | 95% | 95% |
| Magnesium Powder | 1.5 | — | 1.5 | 1.5 | — |
| Aluminum Powder | 1.5 | 3.0 | 1.5 | 1.5 | 3.0 |
| Silicon Carbide, −16 +30 m | — | — | — | — | — |
| Sri Lankan Graphite, −4 +10 mesh | — | — | 2.0 | — | — |
| Zirconia, −10 +28 mesh | — | — | — | 2.0 | 2.0 |
| Plus: | | | | | |
| Novalak Resin | 4.3 | 4.3 | 4.3 | 4.3 | 4.3 |
| Hexamethylenetetramine | 0.21 | 0.21 | 0.21 | 0.21 | 0.21 |
| Flake Graphite | 2.5 | 2.5 | 2.5 | 2.5 | 2.5 |
| Carbon Black | — | — | — | — | — |
| Mixer: | | | Eirich | | |
| Mixing Time, minutes: | | | 4 | | |
| Dimensions at the Press, inches (Av 1) | | | | | |
| Length: | 9.01 | 9.01 | 9.01 | 9.01 | 9.01 |
| Width: | 4.54 | 4.54 | 4.53 | 4.53 | 4.53 |
| Thickness: | 2.20 | 2.20 | 2.49 | 2.50 | 2.51 |
| Bulk Density, pcf (Av 1): | 186 | 188 | 185 | 188 | 189 |
| Baked at 400° F.: | yes | yes | yes | yes | yes |
| Tar Impregnated after baking, with 240° F. petroleum pitch: | yes | yes | yes | yes | yes |
| Baked at 1000° F. (reducing conditions) after Tar Impregnation: | yes | yes | yes | yes | yes |
| Dimensions, inches (As Received) (Av) | (9) | (9) | (5) | (5) | (5) |
| Length: | 8.98 | 8.98 | 8.98 | 8.99 | 8.98 |
| Width: | 4.51 | 4.50 | 4.50 | 4.51 | 4.50 |
| Thickness: | 2.48 | 2.48 | 2.46 | 2.48 | 2.49 |
| Bulk Density, pcf As Received (Av): | 185(9) | 187(9) | 185 | 187(5) | 189(5) |
| Data from Porosity (Av 3) As received | | | | | |
| Bulk Density, pcf: | 185 | 187 | 184 | 187 | 188 |
| % Apparent Porosity: | 9.0 | 8.5 | 8.0 | 8.1 | 7.4 |
| Apparent Sp. Gr.: | 3.26 | 3.27 | 3.20 | 3.25 | 3.25 |
| Data from Porosity (Av 3) After 2000° F. Coking | | | | | |
| Bulk Density, pcf: | 185 | 186 | 183 | 185 | 187 |
| % Apparent Porosity: | 12.6 | 12.8 | 13.0 | 13.8 | 12.6 |
| Apparent Sp. Gr.: | 3.40 | 3.41 | 3.37 | 3.43 | 3.42 |
| Total Carbon by Leco, % As Received: | 4.50 | 4.61 | 6.28 | 4.55 | 4.73 |
| Modulus of Rupture, psi | | | | | |
| At room Temp. (Av 3): | 2390 | 2770 | 2390 | 2610 | 3460 |
| At 2000° F. (Av 3): | 3750 | 3880 | 4160 | 3730 | 3330 |
| Crushing Strength at 2800° F., psi (Av 3) Reducing Conditions: | 3250+ | 2870 | 3510 | 3010 | 2790 |

The visual results of the POFI testing were as follows:

| Example No. | Run I |
|---|---|
| 2 | Small crack down middle, very little spalling |
| 3 | Cracking plus some spalling |
| 4 | Crack down middle, no spalling |
| 5 | Crack down middle, no spalling |
| 6 | Crack down middle, very slight spalling |

| Example No. | Run II |
|---|---|
| 2 | Cracking and some spalling |
| 3 | Cracking, spalling |
| 4 | Some cracking, no real spalling |
| 5 | Some spalling, very little cracking |
| 6 | Some cracking, very little spalling |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A valve for high temperature molten metals comprising:
A pair of plates disposed for slidable movement therebetween, each of said plates having an aperture therethrough which when in registration permit passage of molten metal therethrough and which when out of registration prevent said passage of molten metal, at least one of said plates having at least its molten metal contacting surfaces of a refractory material consisting essentially of carbon bonded magnesite.

2. A valve according to claim 1 in which said carbon bonded magnesite is unburned.

3. A valve according to claim 2 further including control means for controlably providing relative movement to said plates thereby to move at least one of said plates into and out of registration with the other of said plates.

4. A valve according to claim 3 in which said carbon bonded magnesite consists essentially of a refractory containing at least about 5% by weight carbon and at least about 74% by weight of magnesite.

5. A valve according to claim 3 further including a third plate, positioning means for positioning said third plate in fixed predetermined relationship to said other of said plates and in slidable relationship to said at least one of said plates.

6. A valve according to claim 5 wherein said third plate includes an aperture and wherein said fixed predetermined relationship includes registration of said aperture of said third plate with said aperture of said other of said plates.

7. A valve according to claim 2 in which said at least one of said plates includes an insert which contains said molten metal contacting surfaces.

8. A valve according to claim 7 in which said at least one of said plates is movable.

9. A valve according to claim 7 in which the other of said plates is movable.

10. A valve according to claim 7 in which said carbon bonded magnesite consists essentially of a refractory containing at least about 5% by weight carbon and at least about 74% by weight of magnesite.

11. A valve according to claim 7 in which said insert is removable.

12. A valve according to claim 2 in which said carbon bonded magnesite consists essentially of a refractory containing at least about 5% by weight carbon and at least about 74% by weight of magnesite.

13. A valve according to claim 1 in which both of said pair of plates include inserts which contain molten metal contacting surfaces and in which said inserts are of a material consisting essentially of unburned carbon bonded magnesite.

14. A valve according to claim 13 in which said carbon bonded magnesite consists essentially of a refractory containing at least about 5% by weight carbon and at least about 74% by weight of magnesite.

15. A valve according to claim 1 in which said carbon bonded magnesite consists essentially of a refractory containing at least about 5% by weight carbon and at least about 74% by weight of magnesite.

16. A valve according to claim 1 wherein said material further includes from zero to 7% by weight of a powdered metal selected from the group consisting of aluminum, silicon, and magnesium.

17. A valve according to claim 1 wherein said material further includes from zero to 40% by weight of a spalling inhibitor.

18. A valve according to claim 1 wherein said material further includes from 2.5 to 15% by weight of carbon additives.

19. A valve according to claim 18 wherein said carbon additive is selected from the group consisting of phenolic resins and resol resins.

20. A valve according to claim 1 wherein said magnesite has a specific gravity of at least 3.39, a lime-to-silica ratio of at least 2 to 1 and has a boron oxide content less than 0.06% by weight.

21. A valve according to claim 1 further including a third plate, positioning means for positioning said third plate in fixed predetermined relationship to one of said pair of plates and in slidable relationship to the other of said pair of plates.

22. A valve according to claim 21 wherein said third plate includes an aperture and wherein said fixed predetermined relationship includes registration of said aperture of said third plate with said aperture of said one of said pair of plates.

23. A slide gate assembly for use with a metal-working vessel comprising at least one stationary refractory plate and at least one sliding refractory plate slidably engaged with said stationary plate, said refractory plates each having at least one passage therethrough and spaced in relation to each other such that said sliding refractory plate can be moved to bring its passage into and out of alignment with the passage of said at least one stationary plate to effect discharge or retention of molten metal in said metal-working vessel; at least a portion of each of said refractory plates consisting essentially of an unburned high-strength carbon-bonded magnesite refractory containing at least about 5% by weight carbon and at least about 74% by weight magnesite.

* * * * *